(12) United States Patent
Eriksson et al.

(10) Patent No.: US 11,110,807 B2
(45) Date of Patent: Sep. 7, 2021

(54) SYSTEM AND METHOD FOR BALANCING STATE OF CHARGE IN A PROPULSION SYSTEM FOR AN ELECTRIC VEHICLE

(71) Applicant: Volvo Car Corporation, Gothenburg (SE)

(72) Inventors: Robert Eriksson, Hälta (SE); Nikitas Sidiropoulos, Öjersjö (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/836,978

(22) Filed: Apr. 1, 2020

(65) Prior Publication Data

US 2020/0353823 A1    Nov. 12, 2020

(30) Foreign Application Priority Data

May 7, 2019   (EP) .................................... 19173020

(51) Int. Cl.
  *B60L 50/51*   (2019.01)
  *B60L 50/60*   (2019.01)
  *B60L 58/12*   (2019.01)

(52) U.S. Cl.
  CPC ............ *B60L 50/51* (2019.02); *B60L 50/66* (2019.02); *B60L 58/12* (2019.02); *B60L 2210/42* (2013.01); *B60L 2210/46* (2013.01)

(58) Field of Classification Search
  CPC .......... B60L 50/51; B60L 50/66; B60L 58/12; B60L 2210/42; B60L 2210/46; B60L 50/60
  See application file for complete search history.

(56) References Cited

U.S. PATENT DOCUMENTS

| 9,899,948 | B2 | 2/2018 | Bosch |
| 2007/0120520 | A1 | 5/2007 | Kaneko |
| 2008/0304189 | A1 | 12/2008 | Tang et al. |
| 2009/0033253 | A1 | 2/2009 | Nagashima et al. |

(Continued)

FOREIGN PATENT DOCUMENTS

| DE | 102015214276 A1 | 2/2017 |
| DE | 102017217298 A1 | 3/2019 |

(Continued)

OTHER PUBLICATIONS

Shang et al., Hybrid hydrogen PEM fuel cell and batteries without DC-DC converter, International Journal of Low-Carbon Technologies, vol. 11, Issue 2, May 1, 2016, pp. 205-210.

(Continued)

*Primary Examiner* — Robert L Deberadinis
(74) *Attorney, Agent, or Firm* — Clements Bernard Walker; Christopher L. Bernard (57) ABSTRACT

A propulsion system for an electric vehicle, the system comprising a high voltage battery unit having a first high voltage battery connected in series with a second high voltage battery such that a nominal operating voltage of the high voltage battery unit is the sum of a voltage of the first high voltage battery and a voltage of the second high voltage battery; at least one power inverter arranged to connect the high voltage battery unit and the first high voltage battery to at least one electrical machine; wherein the power inverter is configured to distribute energy generated by the at least one electrical machine to the first and second high voltage battery to balance a state of charge of the first and second high voltage battery.

15 Claims, 6 Drawing Sheets

(56) References Cited

U.S. PATENT DOCUMENTS

2015/0162855 A1 6/2015 Chien et al.
2016/0006276 A1 1/2016 Mikulec et al.

FOREIGN PATENT DOCUMENTS

| FR | 3031844 A1 | 7/2016 |
|---|---|---|
| GB | 2550955 A | 12/2017 |
| JP | 2006025518 A | 1/2006 |
| KR | 20100122839 A | 12/2010 |
| KR | 20100133839 A | 12/2010 |
| WO | 2018227307 A1 | 12/2018 |

OTHER PUBLICATIONS

Howroyd, Powerpath controller for fuel cell & battery hybridisation, Aeronautical & Automotive Engineering, Loughborough University, LE11 3TU, United Kingdom, pp. 1-10, Feb. 2, 2016.
Oct. 16, 2019 European Search Report issue on International Application No. EP1973040.

SYSTEM AND METHOD FOR BALANCING STATE OF CHARGE IN A PROPULSION SYSTEM FOR AN ELECTRIC VEHICLE

CROSS-REFERENCE TO RELATED APPLICATIONS

The present disclosure claims the benefit of priority of co-pending European Patent Application No. 19173020.9, filed on May 7, 2019, and entitled "SYSTEM AND METHOD FOR BALANCING STATE OF CHARGE IN A PROPULSION SYSTEM FOR AN ELECTRIC VEHICLE," the contents of which are incorporated in full by reference herein. The contents of European Patent Application Nos. 19173027.4 and 19173040.7 are also incorporated in full by reference herein.

TECHNICAL FIELD

The present invention relates to systems and methods for balancing the state of charge in an electrical propulsion system for a vehicle.

BACKGROUND

Electric vehicles generally relate to vehicles that have batteries or battery units that store energy, where the batteries are designed to provide electrical power for propelling and accelerating the vehicle and also for providing power to electrical systems used in the vehicle. The stored energy is consumed when the electric vehicle is driven, and the battery needs to be re-charged to replenish the level of stored energy through a connection to an external electric power supply.

Due to the existing charging infrastructure with charging stations having different properties, it has been found that it is advantageous to be able to charge the vehicle using different charging voltages, such as 400V and 800V. Moreover, propulsion systems exist for operation at either 400V or 800V.

One solution for enabling charging at 400V and 800V is to equip the vehicle with dual battery banks wherein the battery banks may be two 400V banks arranged in series, thereby allowing charging at both 400V and 800V. Battery banks typically contain cell-balancing circuitry to ensure that the battery cells within a battery are at approximately the same state-of-charge. However, for a dual battery bank system it is also important to balance the state of charge between the two battery banks.

Imbalance between battery banks may for example occur if loads connected to one of the banks consume more power than loads connected to the other bank.

In existing 800V propulsion systems, a bi-directional DC/DC converter can be used to be compatible with 400V charging stations. The DC/DC converter can also be used to balance between banks during regenerative braking.

However, it is still desirable to find improved solutions for battery bank balancing in an electrical propulsion system for a vehicle.

SUMMARY

In view of above-mentioned properties of prior art systems for electrical vehicles, it is an object of the present invention to provide an improved propulsion system for an electrical vehicle.

The propulsion system described herein system comprises a high voltage battery unit having a first high voltage battery connected in series with a second high voltage battery such that a nominal operating voltage of the high voltage battery unit is the sum of a voltage of the first high voltage battery and a voltage of the second high voltage battery. The nominal operating voltages of the first and second high voltage battery may for example be 400V such that the nominal operating voltage of the high voltage battery unit is 800V.

The propulsion system further comprises at least one power inverter arranged to connect the high voltage battery unit and the first high voltage battery to at least one electrical machine. Moreover, the power inverter is configured to distribute energy generated by the at least one electrical machine to the first and second high voltage battery to balance a state of charge of the first and second high voltage battery.

By means of the described configuration of a propulsion system and the properties of the power inverter, battery bank balancing can be achieved without the use of a DC/DC converter. The described system architectures and functionality can be implemented using a range of different configurations of the power inverter and the electrical machine as will be described in further detail in the following description where both systems and methods for controlling the systems will be described.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
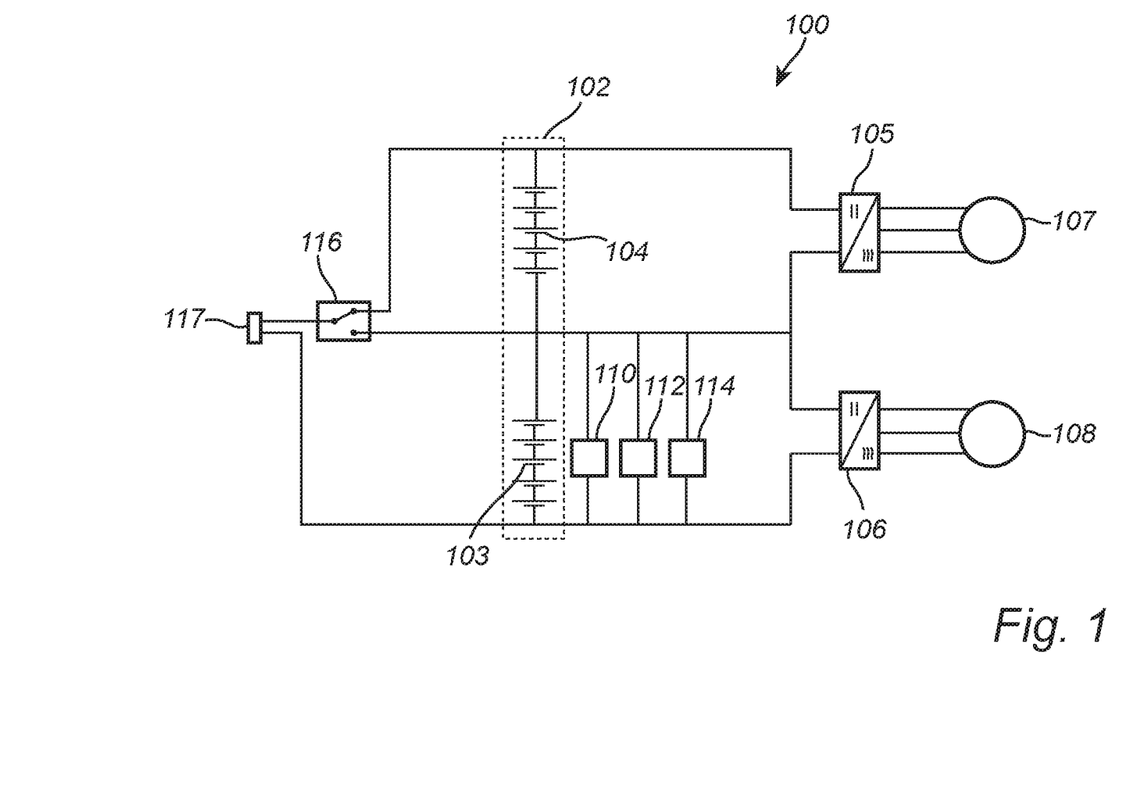
FIG. 1 schematically illustrates a propulsion system according to an embodiment of the invention.

FIG. 1 schematically illustrates a propulsion system 100 for an electric vehicle. The system 100 comprises a high voltage battery unit 102 having a first high voltage battery 103 connected in series with a second high voltage battery

104 such that an operating voltage of the high voltage battery unit 102 is the sum of a voltage of the first high voltage battery 103 and a voltage of the second high voltage battery 104. The first and second high voltage batteries 103, 104 may also be referred to as battery banks.

The system 100 further comprises a first power inverter 105 and a second power inverter 106 arranged to connect the high voltage battery unit 102 comprising the first high voltage battery 103 and the second high voltage battery 104 to a first electrical machine 107 and to a second electrical machine 108. The first and second power inverters 105, 106 are configured to distribute energy generated by the first and second electrical machines 107, 108 to the first and second high voltage battery 103, 104 to balance a state of charge of the first and second high voltage battery 103, 104.

In the example embodiment of FIG. 1, the propulsion system 100 comprises two power inverters 105, 106 and two electrical machines 107, 108, where the first electrical machine 107 may be connected to a front axle of the vehicle and the second electrical machine 108 may be connected to a rear axle of the vehicle.

The method for controlling the propulsion system 100 of FIG. 1 thus comprises controlling the power inverters 105, 106 to distribute energy generated by either of the first and second electrical machine 107, 108 to the first and second high voltage battery 103, 104 to balance a state of charge of the first and second high voltage battery 103, 104. Accordingly, energy distribution during regenerative braking is controlled according to a respective state of charge of the first and second high voltage battery 103, 104.

In a braking mode, i.e. during regenerative braking of the vehicle, the inverter current and voltage can be controlled in such a way that a negative torque is produced within the electrical machine. Balancing between the battery banks 103, 104 can be achieved by producing different amounts of negative torque in a front compared to in a rear electric drive system.

In a driving mode, the inverter current and voltage can be controlled in such a way that a positive torque is produced within the electrical machine. Balancing between the battery banks can be achieved by producing a different amount of positive torque in a front compared to in a rear electric drive system.

In the following examples, a nominal operating voltage of the first and second high voltage battery 103, 104 is taken to be 400V. This means that an actual operating voltage may be somewhat above or below the nominal operating voltage at any given point in time depending on e.g. the state of charge of the battery and other operating conditions. Accordingly, a nominal operating voltage of the high voltage battery unit 102 is here 800V.

Since the DC sides of the inverters 105, 106 are connected to both the first high voltage battery 103 and to the high voltage battery unit 102, the inverters 105, 106 can be controlled to balance the battery banks 103, 104 as needed. Accordingly, the inverters 105, 106 operate based on a state-of-charge of the respective high voltage battery 103, 104 such that when energy is recuperated by an electrical machine 107, 108 e.g. through regenerative braking, the battery bank 103, 104 having the lowest state of charge can be charged.

The illustrated propulsion system further 100 comprises a plurality of loads 110, 112, 114 here arranged to be powered the first high voltage battery 103. It should be noted that the loads equally well may be powered by the second high voltage battery 104. By connecting the loads to one of the 400V battery banks 103, 104, conventional 400V components may be used also in an 800V propulsion system to maximize the features in common with a 400V system, thereby reducing the cost and complexity of the 800V system 100. The loads 110, 112, 114 may for example be components operating at 400V such at heaters, climate control systems or the like, or it may be DC/DC converters providing power to a 48V system and/or to a 12V system.

Moreover, the system 100 comprises a switch 116 connected to a DC-charging inlet 117, the switch being configured to connect the DC-charging inlet 117 to the first high voltage battery 103 or to the high voltage battery unit 102 based on an amplitude of a received voltage from the DC-charging inlet 117. Thereby, the vehicle may be charged using either a 400V or an 800V input voltage. The illustrated system may also comprise an AC charger (not shown) enabling charging using an AC-voltage.

The overall functionality of the described system can be considered to be controlled by one or more control units (not shown). The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may for example be a general-purpose ECU (electrical control unit), or one or more application specific control units.

The claimed methods for controlling state of charge balancing can thereby be performed by control units of the various described components, for example under control of a coordinating propulsion system control unit.

In further detail, FIG. 1 illustrates an example embodiment of a propulsion system 100 comprising a first three-phase power inverter 105 connected to a first three-phase electrical machine 107 and a second three-phase power inverter 106 connected to a second three-phase electrical machine 108. The three-phase power inverters 105, 106 may for example be 400V inverters, enabling the use of standard 400V components, and where each battery bank 103, 104 is separately connected to a DC input of a respective inverter 105, 106.

To enable state of charge balancing between the first and second high voltage battery 103, 104, the first and second electrical machines 107, 108 may also be configured to provide a combined propulsive power higher than a requested propulsive power. Since more power is provided to the electrical machines 107, 108 than what is required for vehicle propulsion, energy can be recuperated in one of the first and second electrical machine 107, 108 to balance a state of charge of the first and second high voltage battery 103, 104. The power can therefore be seen as being transferred through the road. In other words, the propulsive power provided to one axle is higher than the required or requested propulsive power so that the excess power can be recovered by the electrical machine connected to the other axle. It should however be note that the power being transferred, i.e. the difference between the requested mechanical power for propulsion and the provided power is relatively small compared to the total requested propulsive power.

A method for controlling the system 100 of FIG. 1 may further comprise providing a combined propulsive power higher than a requested propulsive power; and recuperating energy in one of the first and second electrical machine 107, 108 to balance a state of charge of the first and second high voltage battery 103, 104. In practice, this can be seen as drawing power from one battery bank to charge the other battery bank. Accordingly, state of charge balancing between battery banks can be performed without regenerative braking taking place. The requested propulsive power can be defined as the power requested by the propulsion system, from the electrical motors, to be provided to one or more axles of the vehicle.

Figure 2:
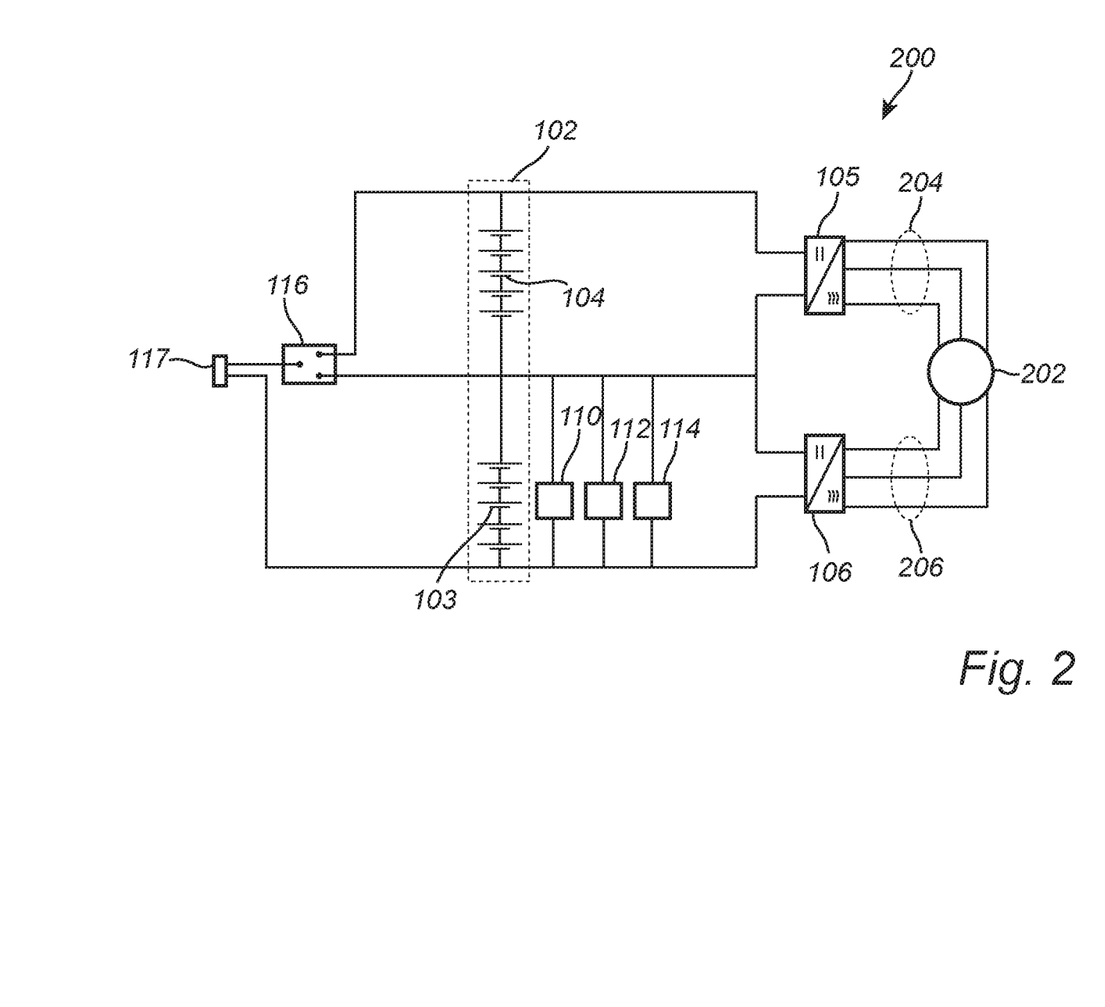
FIG. 2 schematically illustrates a propulsion system according to an embodiment of the invention.

FIG. 2 illustrates an example embodiment of a propulsion system 200 comprising a first power inverter 105 connected to a first set 204 of three phases of a dual winding three-phase electrical machine 202 and a second power inverter 106 connected to a second set 206 of three phases of the dual winding three-phase electrical machine 202, wherein the first and second power inverters 105, 106 are configured to provide a combined power to the dual winding electrical machine 202 higher than a requested power, and wherein the dual winding electrical machine 202 is configured to recuperate energy in one of the first and second sets 204, 206 of three phases to balance a state of charge of the first and second high voltage battery 103, 104. Accordingly, a power is provided to a stator winding of the first set 204 of three phases which is higher than the requested power for propulsion such that the excess power can be regenerated by the stator of the second set 206 of three phases. Power is here transferred through the electrical machine 202 and the regenerated excess power can be used to charge the battery bank having the lower state of charge, thereby balancing the state of charge of the first and second high voltage battery 103, 104.

A method for controlling the propulsion system 200 of FIG. 2 may comprise controlling the first and second inverters 105, 106 to provide a combined propulsive power to the electrical machine higher than a requested propulsive power and controlling the dual winding three-phase electrical machine 202 to recuperate energy in one of the first and second sets 204, 206 of three phases to balance a state of charge of the first and second high voltage battery 103, 104.

Figure 3:
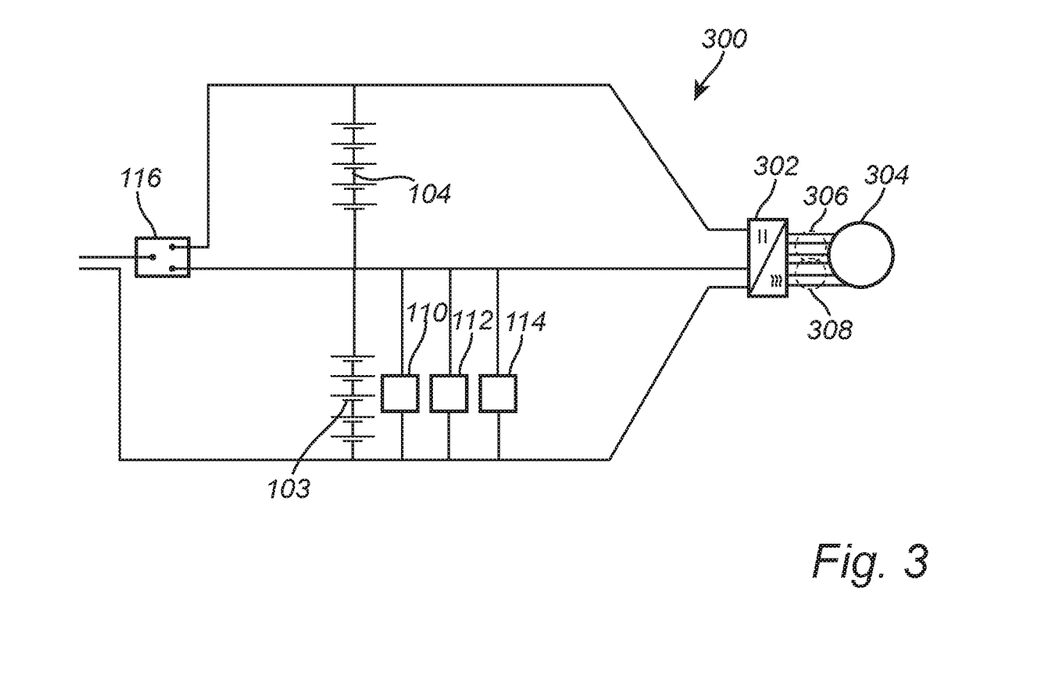
FIG. 3 schematically illustrates a propulsion system according to an embodiment of the invention.

FIG. 3 schematically illustrates an example embodiment of a propulsion system 300 comprising a six-phase power inverter 302 connected to a six-phase electrical machine 304. The six-phase electrical machine 304 is configured to transfer power from a first set 306 of three phases to a second set 308 of three phases to balance a state of charge of the first and second high voltage battery 103, 104. The six-phase power inverter 302 is configured to provide two different voltages, e.g. 400V and 800V, in order to be able to charge both of the first and second high first and second high voltage battery 103, 104. The operation of the system of FIG. 3 is similar to what is described above with reference to the system illustrated by FIG. 2.

A method for controlling the system 300 of FIG. 3 may thereby comprise operating the six-phase electrical machine 304 as a three-phase transformer to transfer power from a first set 306 of three phase windings to a second set 308 of three phase windings and controlling the six-phase power inverter 302 to balance the state of charge of the first and second high voltage battery 103, 104.

Figure 4:
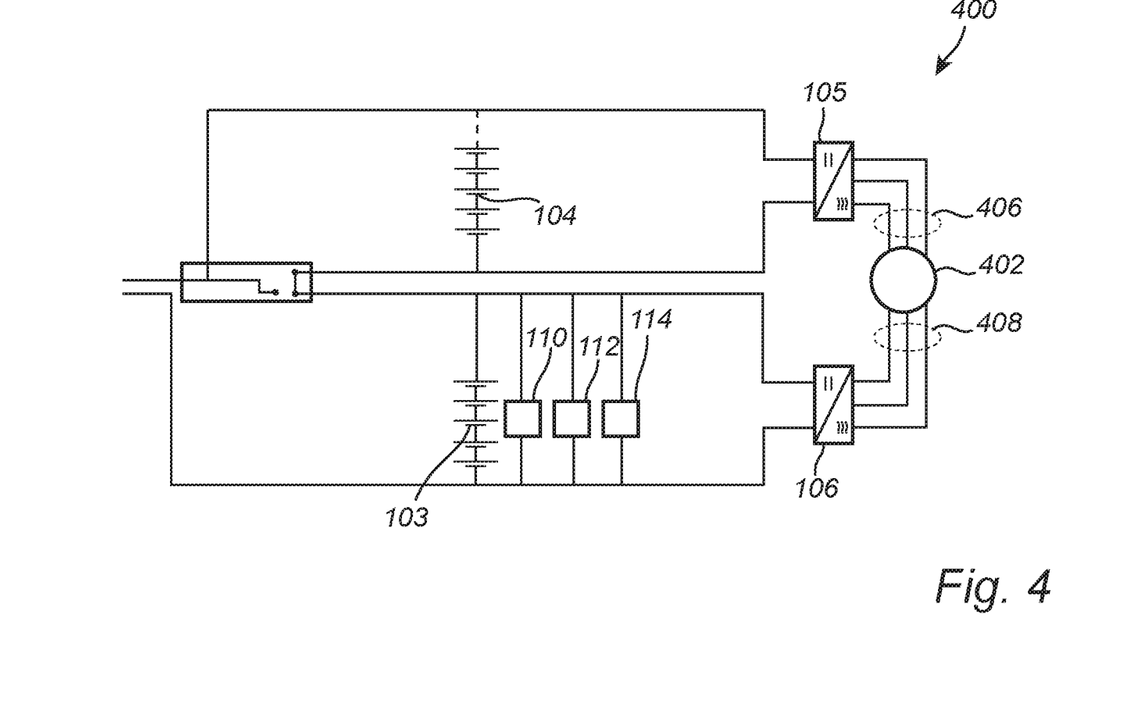
FIG. 4 schematically illustrates a propulsion system according to an embodiment of the invention.

FIG. 4 schematically illustrates an example embodiment of a propulsion system 400 comprising a first three-phase inverter 105 connected to a first set 406 of three phases of a six-phase electrical machine 402 and a second three-phase inverter 106 connected to a second set 408 of three phases of the six-phase electrical machine 402, wherein the six-phase electrical machine 402 is configured to transfer power from the first set 406 of three phases to the second set 408 of three phases to balance a state of charge of the first and second high voltage battery 103, 104.

By using the configuration illustrated in FIG. 4, it is possible to perform charge balancing also when the vehicle is at standstill since power can be transferred through the electrical machine 402. However, to ensure that the vehicle wheels are not rotating during power transfer, two approaches may be used. A first approach for preventing the electric machine 402 from rotating during power transfer, is to attach a brake directly to the electric machine or on the wheels or axle of the vehicle. A second approach for preventing the wheels from rotating is to arrange a disconnect clutch between the electric machine and the wheels. By opening the clutch during power transfer, the electric machine is disconnected from the wheels, thus preventing the rotating electric machine to cause the vehicle to move.

Figure 5:
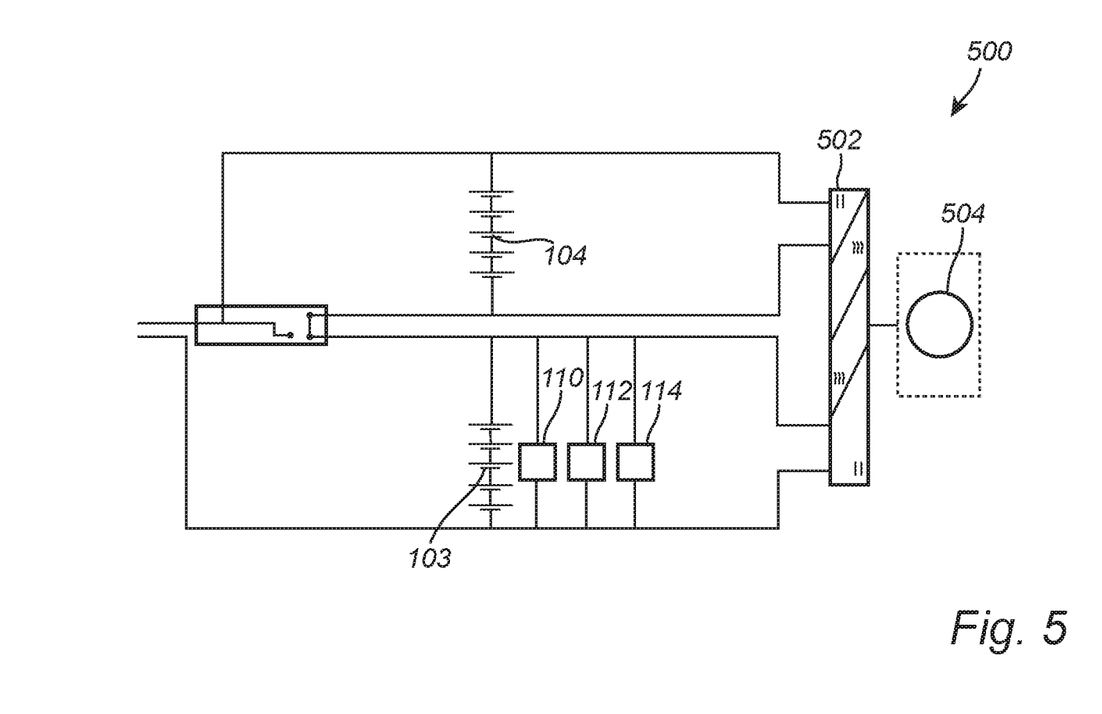
FIG. 5 schematically illustrates a propulsion system according to an embodiment of the invention.

FIG. 5 schematically illustrates an example embodiment of a propulsion system 500 comprising a multilevel inverter 502 connected to an electrical machine 504. The multilevel inverter 502 is configured to receive an AC-voltage from the electrical machine 504 and to provide a first DC-voltage corresponding to a nominal operating voltage of the first high voltage battery 103 to the first high voltage battery 103 and a second DC-voltage corresponding to a nominal operating voltage of the high voltage battery unit 102 to the high voltage battery unit 102 to balance a state of charge of the first and second high voltage battery 103, 104.

Since the multilevel inverter 502 can provide multiple voltage levels, e.g. 400V and 800V, the electrical machine 504 may be a 400V or 800V electrical machine. The use of a multilevel inverter 502 also provides redundancy in the inverter 502 so that the electrical machine 504 may be operated also if some phases are malfunctioning in the inverter 502 or if the inverter 502 does not receive a voltage on all inputs.

A method for controlling the system 500 of FIG. 5 may thereby comprise, in the multilevel inverter 502, receiving an AC-voltage from the electrical machine 504 and providing a first DC-voltage corresponding to a nominal operating voltage of the first high voltage battery 103 to the first high voltage battery 103 and/or providing a second DC-voltage corresponding to a nominal operating voltage of the high voltage battery unit 102 to the high voltage battery unit 102 to balance a state of charge of the first and second high voltage battery 103, 104.

Figure 6:
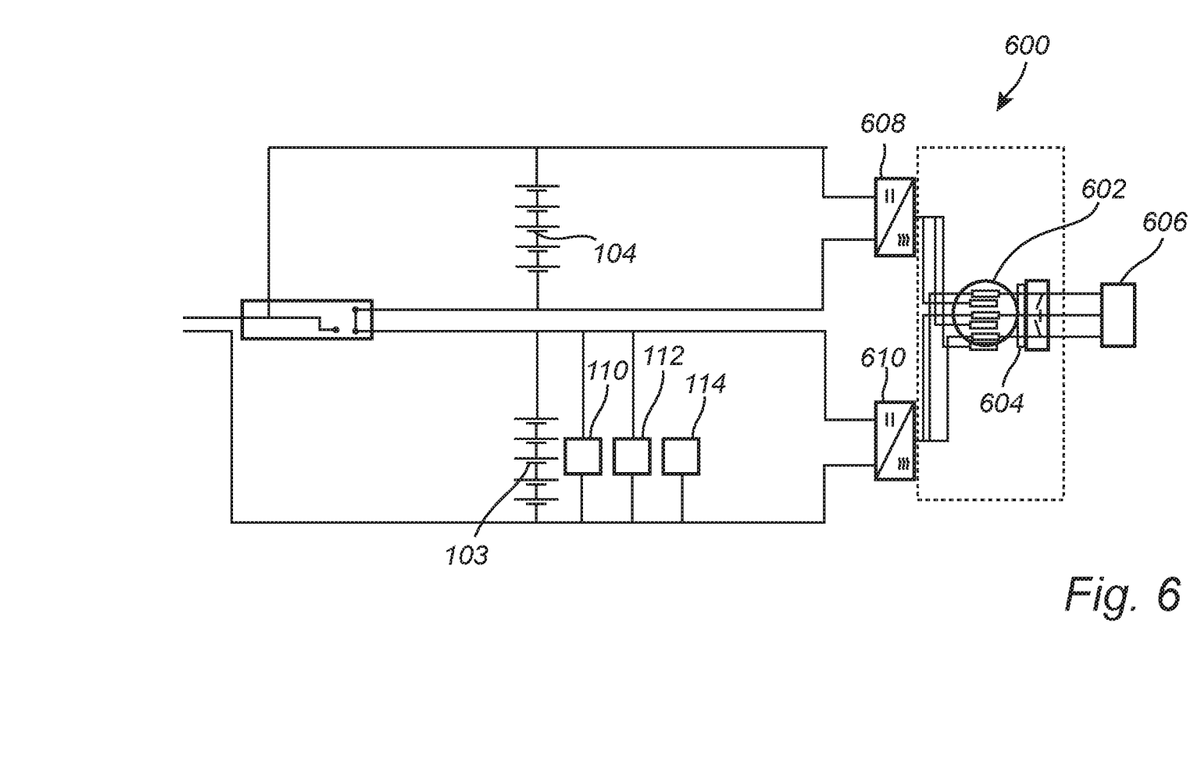
FIG. 6 schematically illustrates a propulsion system according to an embodiment of the invention.

FIG. 6 schematically illustrates an example embodiment of a propulsion system 600 comprising an electrical machine 602 having three windings 604 coupled to a three-phase AC charging inlet 606. The electrical machine 602 is configured to provide power received from the AC charging inlet to the first and second high voltage battery via at least one inverter 608, 610 to balance a state of charge of the first and second high voltage battery 103, 104. By connecting the AC charging inlet 606 directly to the electrical machine 602, there is no need for dedicated AC charger converting the AC-voltage to a DC-voltage, thereby reducing the number of components in the system.

Similarly to what is described above, the rotor of the electrical machine 602 needs to be held still during charging from the AC inlet. The electrical machine 602 can be prevented from moving the vehicle for example by engaging a mechanical brake or by using a clutch disengaging the rotor from the wheels during standstill to prevent the rotor from rotating the wheels during charging from the AC inlet.

In all of the above embodiments describing systems containing 6 phases between electric machine and inverter, the systems provide the flexibility to recuperate energy on both 3 and on 6 phases. In addition, in all of the above described systems containing 6 phases between electric machine and inverter, the systems provide the flexibility for propulsion of the vehicle on both 3 and on 6 phases.

Even though the invention has been described with reference to specific exemplifying embodiments thereof, many different alterations, modifications and the like will become apparent for those skilled in the art. Also, it should be noted that parts of the system may be omitted, interchanged or arranged in various ways, the system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A propulsion system for an electric vehicle, the system comprising:
    a high voltage battery unit having a first high voltage battery connected in series with a second high voltage battery such that a nominal operating voltage of the high voltage battery unit is the sum of a voltage of the first high voltage battery and a voltage of the second high voltage battery; and
    at least one power inverter arranged to connect the high voltage battery unit and the first high voltage battery to at least one electrical machine; wherein the power inverter is configured to distribute energy generated by the at least one electrical machine to the first and second high voltage battery to balance a state of charge of the first and second high voltage battery.

2. The propulsion system according to claim 1, comprising a first three-phase power inverter connected to a first three-phase electrical machine and a second three-phase power inverter connected to a second three-phase electrical machine, wherein the first and second electrical machines are configured to provide a combined propulsive power higher than a requested propulsive power, and to recuperate energy in one of the first and second electrical machine to balance the state of charge of the first and second high voltage battery.

3. The propulsion system according to claim 1, comprising a first power inverter connected to a first set of three phases of a dual winding three-phase electrical machine and a second power inverter connected to a second set of three phases of the dual winding three-phase electrical machine, wherein the first and second power inverters are configured to provide a combined power to the dual winding three-phase electrical machine higher than a requested power, and wherein the dual winding three-phase electrical machine is configured to recuperate energy in one of the first and second sets of three phases to balance the state of charge of the first and second high voltage battery.

4. The propulsion system according to claim 1, comprising a six-phase power inverter connected to a six-phase electrical machine, and wherein the six-phase electrical machine is configured to transfer power from a first set of three phases to a second set of three phases to balance the state of charge of the first and second high voltage battery.

5. The propulsion system according to claim 1, comprising a first three-phase inverter connected to a first set of three phases of a six-phase electrical machine and a second three-phase inverter connected to a second set of three phases of the six-phase electrical machine, wherein the six-phase electrical machine is configured to transfer power from the first set of three phases to the second set of three phases to balance the state of charge of the first and second high voltage battery.

6. The propulsion system according to claim 1, comprising a multilevel inverter connected to an electrical machine, wherein the multilevel inverter is configured to receive an AC-voltage from the electrical machine and to provide a first DC-voltage corresponding to a nominal operating voltage of the first high voltage battery to the first high voltage battery and a second DC-voltage corresponding to a nominal operating voltage of the high voltage battery unit to the high voltage battery unit to balance a state of charge of the first and second high voltage battery.

7. The propulsion system according to claim 1, comprising an electrical machine having three windings coupled to a three-phase AC charging inlet, and wherein the electrical machine is configured to provide power received from the AC charging inlet to the first and second high voltage battery via at least one inverter to balance a state of charge of the first and second high voltage battery.

8. The propulsion system according to claim 1, further comprising at least one load arranged to be powered by one of the first and second high voltage battery.

9. The propulsion system according to claim 1, further comprising a switch connected to a DC-charging inlet, the switch being configured to connect the DC-charging inlet to the first high voltage battery or to the high voltage battery unit based on a received voltage from the DC-charging inlet.

10. A method for controlling a propulsion system for an electric vehicle having a high voltage battery unit having a first high voltage battery connected in series with a second high voltage battery such that a nominal operating voltage of the battery unit is the sum of a voltage of the first high voltage battery and a voltage of the second high voltage battery and at least one power inverter arranged to connect the high voltage battery unit and the a first high voltage battery to at least one electrical machine; wherein the method comprises:
    controlling the power inverter to distribute energy generated by the at least one electrical machine to the first and second high voltage battery to balance a state of charge of the first and second high voltage battery.

11. The method according to claim 10, in a system having a first three-phase power inverter connected to a first three-phase electrical machine and a second three-phase power inverter connected to a second three-phase electrical machine, wherein the method further comprises controlling the first and second electrical machines to:
    provide a combined propulsive power higher than a requested propulsive power; and
    to recuperate energy in one of the first and second electrical machine to balance a state of charge of the first and second high voltage battery.

12. The method according to claim 10, in a system having a first power inverter connected to a first set of three phases of a dual winding three-phase electrical machine and a second power inverter connected to a second set of three phases of the dual winding three-phase electrical machine, wherein the method comprises:
    controlling the first and second inverters to provide a combined propulsive power to the electrical machine higher than a requested propulsive power; and controlling the dual winding three-phase electrical machine to recuperate energy in one of the first and second sets of three phases to balance a state of charge of the first and second high voltage battery.

13. The method according to claim 10, in a system having a six-phase power inverter connected to a six-phase electrical machine, wherein the method comprises:
operating the six-phase electrical machine as a three-phase transformer to transfer power from a first set of three phase windings to a second set of three phase windings; and
controlling the six-phase power inverter to balance the state of charge of the first and second high voltage battery.

14. The method according to claim 10 in a system having a multilevel inverter connected to an electrical machine, the method comprising:
in the multilevel inverter, receiving an AC-voltage from the electrical machine and
providing a first DC-voltage corresponding to a nominal operating voltage of the first high voltage battery to the first high voltage battery and/or providing a second DC-voltage corresponding to a nominal operating voltage of the high voltage battery unit to the high voltage battery unit to balance a state of charge of the first and second high voltage battery.

15. The method according to claim 10, in a system having an electrical machine with three windings coupled to a three-phase AC charging inlet, the method comprising:
receiving power from the AC charging inlet; and
controlling the electrical machine to provide power to the first and second high voltage battery via at least one inverter to balance a state of charge of the first and second high voltage battery.

* * * * *